(No Model.)

T. TRIPP.
ANTI FRICTION BEARING.

No. 315,356. Patented Apr. 7, 1885.

on line x.x.

Witnesses.
H. E. Lodge
A. F. Hayden.

Inventor.
Thomas Tripp.
H. Curtis Atty.

UNITED STATES PATENT OFFICE.

THOMAS TRIPP, OF EAST STOUGHTON, MASSACHUSETTS.

ANTI-FRICTION BEARING.

SPECIFICATION forming part of Letters Patent No. 315,356, dated April 7, 1885.

Application filed January 23, 1885. (No model.)

*To all whom it may concern:*

Be it known that I, THOMAS TRIPP, a citizen of the United States, residing at East Stoughton, in the county of Norfolk and State of Massachusetts, have invented certain new and useful Improvements in Anti-Friction Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to anti-friction journal-boxes wherein a series of anti-friction rolls interposed between the journal-box and the shaft are adapted to roll or travel therewith, by which the friction is reduced to a minimum, and thus sliding friction is prevented, which ordinarily ensues between a rotary shaft and a fixed box.

My invention more particularly relates to the special construction and arrangements of parts relatively to each other; and it consists, primarily, in securing rigidly to the revolving shaft or arbor two separator disks or plates so called, since they indirectly maintain the active bearing-rolls apart to prevent sliding friction, which would occur provided their peripheries were in contact; secondly, in confining the rolls forming the journal between said separator-plates, and thus the whole bearing moves, as an entirety, with and upon the shaft in case end thrusts or shrugs of the latter occur; and, thirdly, in forming the friction-rolls as simple cylinders, which are not confined in any fixed bearing, as has often occurred in previous inventions of the class hereinbefore premised, but are free to revolve, the active bearing-rolls between the journal-box and the exterior periphery of the shaft, and the small series of separator-rolls within annular grooves formed upon the inside faces of the separator-plates and between the active bearing-roller series.

Figure 1:
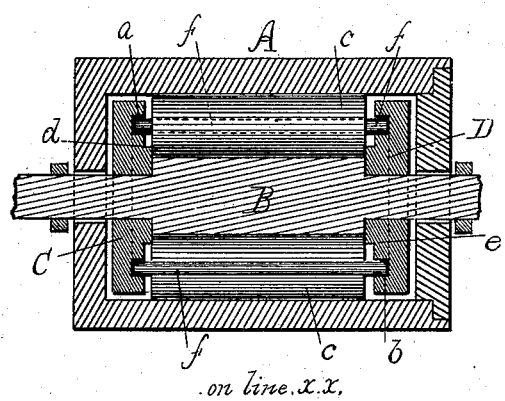
Figure 2:
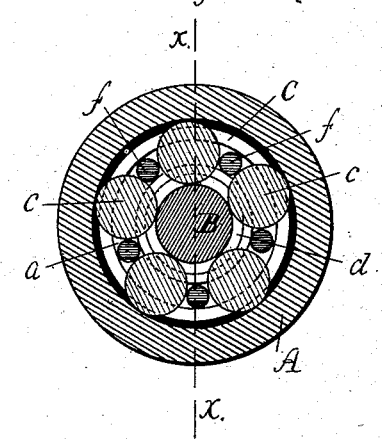
Figure 3:
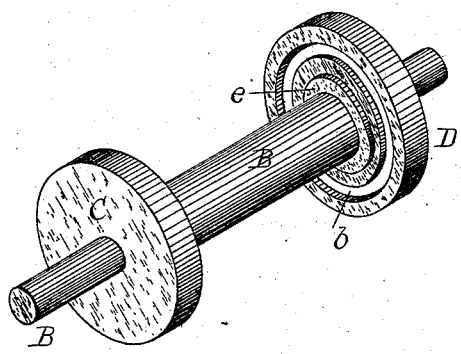

The drawings shown herein represent in Figure 1 a longitudinal vertical section of an anti-friction bearing embodying my invention. Fig. 2 is a transverse section thereof, while Fig. 3 is an isometric elevation of the shaft and its separator-plates attached thereto.

In these drawings, A represents the shell or casing of the journal-box, containing the shaft B, with its inclosing series of rolls, forming the anti-friction bearing. Upon this shaft or arbor B, I have securely and rigidly attached two similar circular plates, C D, and these plates may be adjusted any distance apart upon their shaft to suit the length of bearing required, dependent somewhat upon the friction thereon. Furthermore, the extreme outside periphery of these plates C D shall always be within the extreme outer surfaces of the active bearing-rolls, in order that said plates shall not come in contact with the interior of the journal-box, and this is necessary in order that the whole weight upon the shaft shall be taken upon the interior periphery of the journal-box A by the bearing-rolls. Thus it will be easily understood that these plates are free to revolve with and be carried by the shaft to which they are affixed. These separator-plates, as I have before premised, are circular plates, as shown, and are provided with similar annular slots or grooves, $a\, b$. The centers of these grooves are coincident with the centers of the active bearing series of rolls $c\, c$, &c., when the latter are properly adjusted and rest upon the periphery of their inclosed arbor B. Furthermore, I have provided small shoulders or hubs $d\, e$ upon said plates, and between which the active series of rolls $c\, c$ revolve, and are thus prevented from bearing against the inside opposite faces of the circular plates C D, whereby unnecessary friction is prevented in order to reduce the latter to a minimum.

Figure 5:
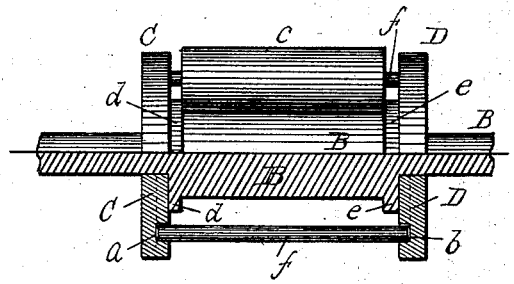

In lieu of constructing the separator-disks with the interior hubs, which operate to steady the active bearing-rolls and prevent their contact with said disks when rotating, I may turn off or slightly reduce the diameter of the shaft sufficiently to form annular lips, which will accomplish the same result, (see Fig. 5 of the drawings;) but I consider this a mere modification of my invention, and one which would easily suggest itself to any mechanic skilled in the art.

Figure 4:
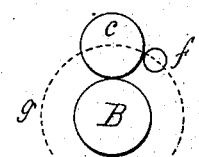

It is evident that the series of active bearing anti-friction rolls $c\, c$, &c., inclosing the shaft B must be retained in fixed relative positions apart with respect to each other, in order that their exterior surfaces may not come in contact, from which sliding friction would result with detriment to the parts, and the advantages of my invention would not be accomplished; hence I have introduced a second smaller series of "separator-rolls," so called, $ff$, &c., alternately disposed between the series of large or active bearing-rolls. These rolls are sections of cylinders, and may be cut of the desired length from steel wire or any other suitable analogous material. When so cut they are disposed with their extremities resting loosely within the corresponding opposite annular grooves $a\,b$. When thus arranged the circumference of a circle, $g$, having its center at the center of the shaft, and described through the centers of the large series of active bearing-rolls $c\,c$, &c., will likewise pass through the centers of the smaller series of separator-rolls $ff$, &c., (see Fig. 4,) and for this reason, as before premised, I have described the center of the annular grooves $a\,b$ with a circumference of a circle the radius of which is equal to a radius (see Fig. 4) extending from the center of the shaft to the center of the large series of bearing-rolls $c\,c$. Thus in order to make up an anti-friction journal as an entirety embodying my invention, I take a shaft, B, provided with the circular plates C D, affixed thereto, and a suitable distance apart to furnish a proper bearing, and insert said shaft within the journal-box A. Then, commencing with the smaller rolls, $ff$, I insert two or three of these first before introducing any of the larger rolls, $c\,c$, and then proceed to introduce the latter alternately with the smaller ones, all of which can be easily admitted in succession until the shaft is almost inclosed, when the small rolls first introduced are adjusted into place and the large rolls are easily dropped into their proper positions. The cap of the box is then adjusted and secured, and the whole is completed. In lieu of this method all the small rolls may be inserted first in their annular grooves in the plates C D before admitting any of the large rolls, which can easily be alternated with them. I am obliged to adopt one of these two methods, since the small series of rolls have to be adjusted angularly with respect to the shaft in order to slip them into their grooves $a\,b$, which cannot be done if the rolls are inserted alternately for the entire distance in the process of inclosing the shaft, since the length of the small rolls is greater than the space existing between the inner faces of the retaining-disks. In anti-friction bearings of this class the journal-box has sometimes contained separator-rings whose function has been to retain the series of rolls in their proper relative positions; but in all these bearings these rings or traveling carriages have not revolved with the shaft, except in so far as the active bearing-rolls tended to alter their position, when thrusts would occur upon the smaller series and effect a slight spreading of the latter, when friction would ensue between said small rolls and the separator-rings, the latter traveling for a short distance while the pressure and friction continued. Now, in a bearing of the class above described end thrusts or shrugs of the shaft carry the series of rolls endwise, and tend to sheer or rotate them angularly with respect to their axial alignment, perhaps cutting into the end of the box and seriously injuring the latter.

In my present device I have endeavored to overcome some of these objections, and therefore have secured the hitherto loose carriage or separator plates securely to the inclosed shaft, and within them have disposed the series of rolls. Thus the bearing as an entirety, consisting of the two separator disks or plates and the two series of rolls, moves with the shaft, and no matter how much or how great the end thrusts or shrugs of the latter may be it does not alter or affect the position of the series of rolls, which are carried with it and protected by the separator-plates. Thus, after the bearing is once adjusted, there can be no displacement or alteration of the two series of rolls with respect to each other, except that consequent upon long wear and usage. Furthermore, since the disks are attached to and travel with the shaft, it is evident that the bearing-rolls $c\,c$ must be rotating oppositely, while the separator-rolls $ff$, which are in contact with said disks C D, are traveling with them. Thus the friction is very small. One great advantage of this bearing is its simplicity of parts, since the rolls are merely sections of cylinders, only of different sizes, while the plates are equally plain in construction. Moreover, owing to this method and manner of forming this bearing the various parts admit of being very much reduced in size and still may be economically and easily constructed. For this reason it is especially adapted to be employed in the operation of roller-skates, where minimum size and expense are needed combined with absence of friction, and consequently great ease in the rotation of the spindle.

I claim—

1. In an anti-friction bearing, the combination, with a rotary shouldered shaft, of separator-disks provided with interior hubs and annular grooves, and securely attached thereto, substantially as herein described.

2. In an anti-friction bearing of the class herein described, the combination, with a rotary shouldered shaft to which are affixed annularly-grooved disks, of two series of rolls contained between the latter, whereby end-thrusts and displacement of the rolls are prevented, substantially as stated.

3. In combination, the shouldered shaft B, circular plates C D affixed thereto, and provided with the annular grooves $a\,b$ and hubs $d\,e$, and two series of rollers, $c\,c, ff$, adapted to travel, respectively, in the manner and for the purposes substantially as herein set forth.

In testimony whereof I affix my signature in presence of two witnesses.

THOMAS TRIPP.

Witnesses:
H. E. LODGE,
A. F. HAYDEN.